(12) United States Patent
Fries et al.

(10) Patent No.: US 7,033,408 B2
(45) Date of Patent: Apr. 25, 2006

(54) METHOD OF PRODUCING AN ABRASIVE PRODUCT CONTAINING DIAMOND

(76) Inventors: Robert Fries, 4 Birnam Rd., Forest Town, 2001, Johannesburg (ZA); Peter Michael Harden, 2 Dulcie Close, Lonehill, 2062, Sandton (ZA)

( * ) Notice: Subject to any disclaimer, the term of this patent is extended or adjusted under 35 U.S.C. 154(b) by 190 days.

(21) Appl. No.: 10/344,177

(22) PCT Filed: Aug. 3, 2001

(86) PCT No.: PCT/IB01/01383

§ 371 (c)(1),
(2), (4) Date: Jul. 22, 2003

(87) PCT Pub. No.: WO02/11876

PCT Pub. Date: Feb. 14, 2002

(65) Prior Publication Data

US 2005/0257430 A1    Nov. 24, 2005

(30) Foreign Application Priority Data

Aug. 8, 2000 (ZA) ................................ 2000/4044

(51) Int. Cl.
*C22C 29/02* (2006.01)
(52) U.S. Cl. .......................... 51/307; 51/309; 428/408; 264/109; 264/122; 264/241; 264/294
(58) Field of Classification Search ................ 51/307, 51/308, 309; 428/408; 264/109, 122, 241, 264/294
See application file for complete search history.

(56) References Cited

U.S. PATENT DOCUMENTS

| 3,918,931 A | 11/1975 | De Vries et al. ............... 51/309 |
| 4,525,178 A | 6/1985 | Hall ............................. 51/309 |
| 5,045,092 A | 9/1991 | Keshavan ..................... 51/293 |

FOREIGN PATENT DOCUMENTS

| EP | 256 829 | 2/1988 |
| EP | 583 916 | 2/1994 |
| EP | 774 527 | 5/1997 |
| JP | 57-116742 | 7/1982 |

*Primary Examiner*—Michael Marcheschi
(74) *Attorney, Agent, or Firm*—Pauley Petersen & Erickson

(57) ABSTRACT

A method of producing an abrasive product comprises providing a mixture of a mass of discrete carbide particles and a mass of diamond particles, the diamond particles being present in the mixture in an amount such that the diamond content of the abrasive product is 25% or less by weight, and subjecting the mixture to elevated temperature and pressure conditions at which the diamond is crystallographically stable and at which substantially no graphite is formed, in the presence of a bonding metal or alloy capable of bonding the mixture into a coherent, sintered product, to produce the abrasive product. The bonding metal or alloy is preferably a combination of a transition metal or a transition metal alloy and up to 40% by volume of the bonding metal or alloy of a second metal which is a stronger carbide former than the transition metal or the transition metal alloy, or an alloy of the second metal.

38 Claims, No Drawings

METHOD OF PRODUCING AN ABRASIVE PRODUCT CONTAINING DIAMOND

BACKGROUND TO THE INVENTION

THIS invention relates to a method of producing an abrasive product containing diamond and cemented carbide.

Cemented carbide is a material which is used extensively in industry for a variety of applications, both as an abrading material and as a wear resistant material. Cemented carbides generally consist of suitable carbide particles such as tungsten carbide, tantalum carbide or titanium carbide, bonded together by means of a bonding metal such as cobalt, iron or nickel, or an alloy thereof. Typically, the metal content of cemented carbides is about 3 to 35% by weight. They are produced by sintering the carbide particles and the bonding metal at temperatures of the order of 1400° C.

At the other end of the spectrum, ultrahard abrasive and wear resistant products are found. Diamond and cubic boron nitride compacts are polycrystalline masses of diamond or cubic boron nitride particles, the bonding being created under conditions of elevated temperature and pressure at which the ultrahard component, i.e the diamond or cubic boron nitride, is crystallographically stable. Polycrystalline diamond (PCD) and polycrystalline cubic boron nitride (PCBN) can be produced with or without a second phase or bonding matrix. The second phase, when provided, may be, in the case of diamond, a catalyst/solvent such as cobalt, or may be a carbide forming element such as silicon. Similar sintering mechanisms are utilised in PCBN synthesis with various carbides, nitrides and borides being common second phases.

PCD and PCBN have a far higher wear resistance than cemented carbides, but tend to be somewhat brittle. This brittleness can lead to edge chipping of the working surface which can present a problem in applications where fine finishes are required. Furthermore, ultrahard products such as PCD and PCBN can generally not be directly brazed onto a metallic support. They are therefore often sintered in combination with a cemented carbide substrate. The bi-layered nature of such ultrahard products can be problematic in terms of thermo-mechanical stresses between the two materials: differential expansion and shrinkage on heating and cooling due to different thermal expansion coefficients and elastic moduli can lead to crack formation or unfavourable residual stresses if the substrate and the ultrahard products are too dissimilar. Another potential problem of such bi-layered materials is that of undercutting, i.e preferential wear of the less abrasion resistant carbide support. Further, machining of ultrahard products is difficult and costly, where carbide products can be relatively easily ground to the final geometry.

Efforts have been made to solve some of these problems.

U.S. Pat. No. 4,525,178 describes a composite material which includes a mixture of individual diamond crystals and pieces of pre-cemented carbide. The mixture is subjected to elevated temperature and pressure conditions in the diamond stable region, to create a composite polycrystalline diamond body. The mixture uses precemented carbide and not discrete carbide particles.

U.S. Pat. No. 5,045,092 describes a method of forming a cemented tungsten carbide article with embedded diamond particles. In this method, the embedded diamond particles are produced in situ.

European Patent No 0,256,829 describes a cemented carbide modified to the extent that it contains up to 20% by weight of cubic boron nitride particles. The cemented carbide is preferably produced under cubic boron nitride synthesis conditions so that damage to the cubic boron nitride is minimised.

European Patent No 0,583,916 describes a method of producing an abrasive product comprising providing a mixture of diamond and discrete carbide particles, the diamond particles being smaller than the carbide particles and present in the mixture in an amount of more than 50% by volume, and subjecting the mixture to elevated temperature and pressure conditions at which the diamond is crystallographically stable, in the presence of a binder metal capable of bonding the mixture into a hard conglomerate.

SUMMARY OF THE INVENTION

According to the invention there is provided a method of producing an abrasive product comprising:

(1) providing a mixture of a mass of discrete carbide particles and a mass of diamond particles, the diamond particles being present in the mixture in an amount such that the diamond content of the abrasive product is 25% or less by weight; and (2) subjecting the mixture to elevated temperature and pressure conditions at which the diamond is crystallographically stable and at which substantially no graphite is formed, in the presence of a bonding metal or alloy capable of bonding the mixture into a coherent, sintered product, to produce the abrasive product.

The bonding metal or alloy is preferably a transition metal or a transition metal alloy, more preferably cobalt, iron or nickel or alloys thereof.

The bonding metal or alloy more preferably comprises a combination of:

(a) a transition metal or a transition metal alloy, preferably cobalt, iron, or nickel or alloys thereof; and (b) up to 40% by volume of the bonding metal or alloy (i.e. metal (a) plus metal (b)) of a second metal which is a stronger carbide former than the transition metal or the transition metal alloy, or an alloy of the second metal.

The metal (b) is preferably selected from the group consisting of silicon, titanium, zirconium, molybdenum, niobium, tungsten, vanadium, hafnium, tantalum, chromium, manganese, boron, beryllium, cerium, thorium, and ruthenium.

Preferably, the bonding metal or alloy comprises from 60% to 99.5% inclusive by volume of the metal (a) and from 0.5% to 40% inclusive by volume of the metal (b).

The metal (a) is preferably provided in powdered form, but may also be added in the form of an organic precursor or salt precursor that is subsequently pyrolised to result in finely dispersed metal.

The metal (b) may be provided in powdered form but may also be added in the form of an organic precursor or salt precursor. Additionally, the metal (b) may be provided in the form of a non-stoichiometric carbide, nitride or boride or in the form of a stoichiometric carbide, nitride or boride where this is sufficiently soluble in the metal (a) such that metal (b) can migrate thorugh metal (a).

The metals (a) and (b) may also be provided in the form of an alloy of the metals (a) and (b).

The bonding metal or alloy, e.g the metals (a) and (b) may be mixed with the carbide particles and with the diamond particles and the mixture may then be sintered as such, or the mixture may first be cold-pressed to produce a weak but coherent body prior to sintering.

Alternatively, the bonding metal or alloy, e.g the metals (a) and (b) may be supplied in the form of a separate layer adjacent to the diamond-carbide mixture and infiltrated during the high temperature/high pressure treatment step.

The diamond particles are preferably present in the mixture in an amount such that the diamond content of the abrasive product is from 10% to 18% inclusive by weight.

The diamond particles may be fine or coarse. The diamond particles preferably have a particle size in the range of from 0.2 µm to 70 µm inclusive, preferably less than 20 µm, more preferably less than 10 µm.

The bonding metal or alloy is preferably used in an amount of from 2% to 20% inclusive by weight of the abrasive product, more preferably from 5% to 20% by weight of the abrasive product, most preferably less than 15% by weight of the abrasive product.

The carbide particles may be any carbide particles used in the manufacture of conventional cemented carbides. Examples of suitable carbides are tungsten carbide, tantalum carbide, titanium carbide and mixtures of two or more thereof.

The carbide particles preferably have a particle size in the range of from 0.1 µm to 10 µm inclusive.

The sintering of the mixture of carbide and diamond particles and the bonding metal or alloy preferably takes place at a temperature in the range of from 1300° C. to 1600° C. inclusive, and at a pressure from 40 to 70 kbar inclusive.

This step is preferably carried out under controlled non-oxidising conditions.

The sintering of the mixture of carbide and diamond particles and the bonding metal or alloy may be carried out in a conventional high temperature/high pressure apparatus. The mixture may be loaded directly into the reaction capsule of such an apparatus. Alternatively, the mixture may be placed on a cemented carbide support or a recess formed in a carbide support, and loaded in this form into the capsule.

In a preferred method of the invention, the carbide particles, the diamond particles, and the bonding metal or alloy have volatiles removed from them prior to sintering, e.g by heating them in a vacuum. These components are preferably then vacuum sealed by, for example, electron beam welding prior to sintering. The vacuum may, for example, be a vacuum of 1 mbar or less and the heating may be a temperature in the range of 500° C. to 1200° C. inclusive.

The abrasive product produced by the method of the invention may be used as an abrasive product for abrading materials, or as a wear resistant material, particularly in tool components or inserts which consist of an abrasive compact bonded to a cemented carbide support. Typical applications include the cutting of wood and construction materials as well as the machining of various non-ferrous metallic work pieces.

DESCRIPTION OF EMBODIMENTS

The crux of the invention is a method of producing an abrasive product by providing a mixture of a mass of discrete carbide particles and a mass of diamond particles, and subjecting the mixture to elevated temperature and pressure conditions at which the diamond is crystallographically stable and at which substantially no graphite is formed, in the presence of a bonding metal or alloy capable of bonding the mixture into a coherent, sintered product. The diamond particles are present in the mixture in an amount such that the diamond content of the abrasive product is 25% or less by weight, preferably in the range of from 10% to 18% inclusive by weight.

The abrasive product produced is, in effect, a cemented carbide which has been modified by the addition of diamond particles. The addition of these particles provides the cemented carbide with greater abrasive and wear resistant properties.

The abrasive product produced must be substantially free of graphite. The presence of any significant quantity of graphite reduces the abrasive wear resistant properties of the product. In producing the product, it is important that conditions are chosen which achieve this.

The sintering step is carried out in the presence of a bonding metal or alloy which preferably comprises a combination of (a) a transition metal or transition metal alloy and (b) up to 40% by volume of the bonding metal or alloy of a second metal which is a stronger carbide former than the transition metal or transition metal alloy, or an alloy of this second metal.

As the carbide forming metals tend to react with the diamond particles, high amounts of such metals can result in excessive loss of the diamond phase and the formation of a high proportion of undesirable brittle phases. Thus, metal (b) is used in an amount up to 40% by volume of the bonding metal or alloy, i.e the total metal content, and this has been found sufficient to achieve a highly wear resistant product.

The presence of the metal (b) leads to improved bonding of the diamond grains to the carbide matrix and thus to an improvement in the properties of the abrasive product produced.

The invention will now be described in more detail with reference to the following examples.

EXAMPLE 1

A powder mixture of 14.9 wt % diamond, 75.7 wt % tungsten carbide and 9.4 wt % cobalt, all in the size range 1 to 2 micron, was thoroughly mixed in a planetary ball mill to achieve a homogeneous blend of the materials. The blend was uniaxially compacted to form a coherent pellet. The pellet was loaded into a metal canister and subsequently outgassed under vacuum at 1100° C. and sealed by electron beam welding. The sealed containers were loaded into the reaction capsule of a standard high pressure/high temperature apparatus and the loaded capsules placed into the reaction centre of this apparatus. The contents of the capsule were exposed to a temperature of approximately 1450° C. and a pressure of 50 kbar. These conditions were maintained for 10 minutes. After completion of the treatment a well-sintered, hard and wear resistant material was recovered from the canister.

The abrasion resistance of the material was tested using a turning test where silica flour filled epoxy resin was machined using the following conditions:

Sample format: 90° quadrant 3.2 mm thick

Tool holder: neutral

Rate angle: 0°

Clearance angle: 6°

Cutting speed: 10 m/min

Depth of cut: 1.0 mm

Feed rate: 0.3 mm/rev

Test duration: 60 s

Under the given conditions the material exhibited a maximum flank wear width of 0.21 mm.

EXAMPLE 2

In order to assess the benefit of a more 'active' carbide-forming metal, in this case $Cr_3C_2$, the following mix was prepared using the method of Example 1:
14.9 wt % diamond
75.7 wt % tungsten carbide
8.5 wt % cobalt
0.9 wt % chromium carbide ($Cr_3C_2$,)

Using the same turning test as in Example 1 the material showed a maximum flank wear width of 0.11 mm.

EXAMPLE 3

A further sample was prepared to assess the benefit of chromium as carbide-forming metal, this time introduced not as a carbide but as metal:
14.9 wt % diamond
76.0 wt % tungsten carbide
5.7 wt % cobalt
2.3 wt % nickel
1.1 wt % chromium Using the same turning test as in Example 1 the material showed a maximum flank wear width of 0.09 mm.

The invention claimed is:

1. A method of producing an abrasive product comprising the steps of:
   (1) providing a mixture including a mass of discrete carbide particles and a mass of diamond particles, the diamond particles being present in the mixture in an amount such that the diamond content of the abrasive product is 10 to 18% inclusive by weight; and
   (2) subjecting the mixture to elevated temperature and pressure conditions at which the diamond is crystallographically stable and at which substantially no graphite is formed, in the presence of a bonding metal or alloy capable of bonding the mixture into a coherent, sintered product, to produce the abrasive product;
   wherein the bonding metal or alloy comprises a combination of 60–99.5% inclusive by volume of a first metal a) selected from the group consisting of transition metals and transition metal alloys, and 0.5–40% inclusive by volume of a second metal b) which is a stronger carbide former than the metal a); and
   the metal b) is selected from the group consisting of silicon, titanium, zirconium, molybdenum, niobium, tungsten, vanadium, hafnium, tantalum, chromium, manganese, boron, beryllium, cerium, thorium, ruthenium, and alloys thereof.

2. A method according to claim 1 wherein the metal b) comprises chromium.

3. A method according to claim 1 wherein the transition metal is selected from the group consisting of cobalt, iron and nickel.

4. A method according to claim 1 wherein the metal (a) is provided in a form selected from powdered form and the form of an organic precursor or salt precursor that is subsequently pyrolised to result in finely dispersed metal.

5. A method according to claim 1 wherein the metal (b) is provided in a form selected from powdered form; the form of an organic precursor or salt precursor; the form of a non-stoichiometric carbide, nitride or boride; and the form of a stoichiometric carbide, nitride or boride soluble in the metal (a).

6. A method according to claim 1 wherein the metal (a) and the metal (b) are provided in the form of an alloy of the metal (a) with the metal (b).

7. A method according to claim 1 wherein in step (1) the bonding metal or alloy is mixed with the carbide particles and with the diamond particles, and in step (2) the mixture is subjected to the elevated temperature and pressure conditions.

8. A method according to claim 1 wherein in step (1) the bonding metal or alloy is mixed with the carbide particles and with the diamond particles, and the mixture is cold-pressed to produce a weak coherent body, and in step (2) the weak coherent body is subjected to the elevated temperature and pressure conditions.

9. A method according to claim 1 wherein in step (1) the bonding metal or alloy is supplied in the form of a separate layer adjacent to the mixture of the mass of carbide particles and the mass of diamond particles, and in step (2) the bonding metal or alloy is infiltrated when the mixture is subjected to the elevated temperature and pressure conditions.

10. A method according to claim 1 wherein the diamond particles have a particle size in the range of from 0.2 µm to 70 µm inclusive.

11. A method according to claim 1 wherein the bonding metal or alloy is used in an amount of from 2% to 20% inclusive by weight of the abrasive product.

12. A method according to claim 1 wherein the carbide particles are selected from the group consisting of tungsten carbide particles, tantalum carbide particles, titanium carbide particles, and mixtures of two or more thereof.

13. A method according to claim 1 wherein the carbide particles have a particle size in the range of from 0.1 µm to 10 µm inclusive.

14. A method according to claim 1 wherein in step (2) the elevated temperature and pressure conditions are a temperature in the range of from 1300° C. to 1600° C. inclusive and a pressure of from 40 kbar to 70 kbar inclusive.

15. A method according to claim 1 wherein step (2) is carried out under controlled non-oxidising conditions.

16. A method according to claim 10 wherein the bonding metal or alloy is used in an amount of from 2% to 20% inclusive by weight of the abrasive product.

17. A method according to claim 16 wherein the carbide particles are selected from the group consisting of tungsten carbide particles, tantalum carbide particles, titanium carbide particles, and mixtures of two or more thereof.

18. A method according to claim 17 wherein the carbide particles have a particle size in the range of from 0.1 µm to 10 µm inclusive.

19. A method of producing an abrasive product, comprising the steps of:
   providing a mixture including discrete carbide particles and diamond particles, the diamond particles being present in an amount such that the abrasive product has a diamond content of 10–18% by weight; and
   subjecting the mixture to elevated temperature and pressure conditions at which the diamond is crystallographically stable and substantially no graphite is formed, in the presence of a bonding metal or alloy to produce the abrasive product;
   wherein the bonding metal or alloy comprises 60–99.5% by volume of a first metal a) selected from the group consisting of transition metals and transition metal alloys, and 0.5–40% by volume of a second metal b) selected from the group consisting of silicon, titanium, zirconium, molybdenum, niobium, tungsten, vanadium, hafnium, tantalum, chromium, manganese, boron, beryllium, cerium, thorium, ruthenium, and alloys thereof.

20. The method of claim 19, wherein the first metal is selected from the group consisting of cobalt, iron, nickel, and alloys thereof.

21. The method of claim 19, further comprising the step of providing the first metal in powdered form.

22. The method of claim 19, further comprising the step of providing the first metal in the form of a pyrolised organic precursor or salt precursor.

23. The method of claim 19, further comprising the step of providing the second metal in powdered form.

24. The method of claim 19, further comprising the step of providing the second metal in the form of an organic precursor or salt precursor.

25. The method of claim 19, further comprising the step of providing the second metal in the form of a carbide, nitride or boride that is soluble in the first metal.

26. The method of claim 19, wherein the elevated temperature is 1300–1600° C.

27. The method of claim 19, wherein the elevated pressure is about 40–70 kbar.

28. The method of claim 19, wherein the carbide particles are selected from the group consisting of tungsten carbide particles, tantalum carbide particles, titanium carbide particles, and combinations thereof.

29. The method of claim 19, wherein the bonding metal or alloy constitutes 2–20% by weight of the abrasive product.

30. A method of producing an abrasive product, comprising the steps of
providing a mixture including carbide particles having a particle size of 0.1–10 microns and diamond particles having a particle size of 0.2–70 microns, the diamond particles being present in an amount such that the abrasive product has a diamond content of 10–18% by weight; and
sintering the mixture at a temperature of 1300–1600° C. and a pressure of 40–70 kbar in the presence of a bonding metal or alloy to produce the abrasive product;
wherein the bonding metal or ahoy comprises 60–99.5% by volume of a first metal a) selected from the group consisting of transition metals and transition metal alloys, and 0.5–40% by volume of a second metal b) selected from the group consisting of silicon, titanium, zirconium, molybdenum, niobium, tungsten, vanadium, hafnium, tantalum, chromium, manganese, boron, beryllium, cerium, thorium, ruthenium, and alloys thereof.

31. The method of claim 30, wherein the diamond particles have a particle size of less than 20 microns.

32. The method of claim 30, wherein the diamond particles have a particle size of less than 10 microns.

33. The method of claim 30, wherein the sintering is performed under controlled non-oxidising conditions.

34. The method of claim 30, further comprising the step of removing volatiles from the carbide particles, diamond particles, and bonding metal or alloy prior to sintering.

35. The method of claim 34, wherein the volatiles are removed by applying a vacuum pressure of 1 mbar or less at a temperature of 500–1200° C.

36. The method of claim 30, wherein the bonding metal or alloy constitutes 2–20% by weight of the abrasive product.

37. The method of claim 30, wherein the bonding metal or alloy constitutes 5–20% by weight of the abrasive product.

38. The method of claim 36, wherein the bonding metal or alloy constitutes less than 15% by weight of the abrasive product.

\* \* \* \* \*